United States Patent [19]
Amorese et al.

[11] Patent Number: 5,275,501
[45] Date of Patent: Jan. 4, 1994

[54] QUICK OPENING MANHOLE COVER ASSEMBLY FOR USE WITH VIRTUALLY ANY SHAPE MANHOLE COVER

[75] Inventors: Franklyn J. Amorese, Hilton; Robert R. Loomis, Rochester, both of N.Y.

[73] Assignee: The Pfaudler Companies, Inc., Rochester, N.Y.

[21] Appl. No.: 803,549

[22] Filed: Dec. 9, 1991

[51] Int. Cl.⁵ ............................................. E02D 29/14
[52] U.S. Cl. ........................................................ 404/25
[58] Field of Search ............................. 404/25; 52/20–; 49/469, 395, 400; 277/200, 212; 220/314

[56] References Cited

U.S. PATENT DOCUMENTS

| | | | |
|---|---|---|---|
| 3,155,116 | 11/1964 | Ver Nooy | 138/89 |
| 4,279,356 | 7/1981 | Amorese et al. | 404/25 X |
| 4,650,365 | 3/1987 | Runnels | 404/25 |
| 4,763,449 | 8/1988 | Vigneron et al. | 404/25 X |
| 4,902,165 | 2/1990 | Embree | 404/25 |
| 4,964,755 | 10/1990 | Lewis et al. | 404/25 |

FOREIGN PATENT DOCUMENTS

704937 3/1941 Fed. Rep. of Germany.
1511087 1/1968 France.

Primary Examiner—Kenneth J. Dorner
Assistant Examiner—Nancy P. Connolly
Attorney, Agent, or Firm—Robert P. Simpson; Michael L. Dunn

[57] ABSTRACT

A quick opening manhole cover assembly is provided which is suitable for use with virtually any shape manhole cover of a pressure vessel. The assembly broadly includes a manhole cover having outer dimensions which are less than the inner dimensions of the manhole so that the cover can pass freely therethrough. The assembly also includes a structure for raising and lowering the cover into and out of the manhole. A sliding lock mechanism is located above the cover and is engageable to prevent axial movement of the cover. A safety mechanism is provided to prevent the lock from disengaging when the vessel is under pressure. Once the lock is engaged, the cover is raised and a seal carried atop the cover provides a fluid tight sealing engagement of the cover. The pressure within the vessel urges the cover further upward to further ensure the integrity of the seal.

14 Claims, 5 Drawing Sheets

Fig. 1.

QUICK OPENING MANHOLE COVER ASSEMBLY FOR USE WITH VIRTUALLY ANY SHAPE MANHOLE COVER

BACKGROUND OF THE INVENTION

The present invention relates to manhole cover assemblies for pressure vessels, and, more particularly, to a quick opening manhole cover assembly which is suitable for use with any shape manhole cover.

Pressure vessels are well known in the art and are used, for example, by the chemical and food industry to process various chemicals and food stuffs. These vessels generally range in size from capacities of a few hundred gallons to several thousand gallons, and can be constructed to withstand internal pressures of several atmospheres. The vessels may be constructed of glass lined steel or of a corrosive-resistant material such as stainless steel.

It is common to provide such vessels with manholes to permit entry into the vessel for cleaning and inspection. Usually, the cover for such a manhole is clamped directly to a flange surrounding the manhole opening. The clamps are sized to withstand the load necessary to compress a gasket between the manhole cover and the flange in order to obtain a leak-free joint. It is not uncommon to use many large clamps in order to distribute the load evenly about the manhole cover and to use a hand tool, such as a wrench, to individually tighten each clamp. Use of a hand tool can result in overtightening that could cause distortion of the flange and damage to the glass lining of the vessel. For example, such clamps could drop into the vessel and damage the glass lining.

Clamp-type covers are also time-consuming to open and close, since each clamp has to be individually wrench tightened several times to properly seat the gasket. This procedure could take as long as an hour depending upon the size of the manhole, the number of clamps used and the pressures expected within the vessel. Conversely, to open the manhole cover, each clamp has to be loosened and removed.

In a successful attempt to solve the above-identified problems, a quick opening manhole cover assembly was invented and patented in U.S. Pat. No. 4,279,356 (Amorese and Piarulli). The invention of this patent provides a quick opening manhole cover assembly where the manhole cover can be opened or closed very quickly and where no clamps are used to compress a gasket between the manhole cover and the vessel. The patented invention includes a sealing means which comprises a plurality of ears of a locking ring engaged beneath a collar in horizontal arcuate grooves. Due to the nature and geometry of the sealing means, the patented invention is only suitable for use with round manhole covers. This is unfortunate in that not all manhole covers are round. For example, many covers for intermediate capacity vessels (500-2000 gallons) are elliptical in shape. It is conceivable that covers of other shapes may also be employed.

What is needed, then, is a quick opening manhole cover assembly for use with virtually any shape cover.

SUMMARY OF THE INVENTION

The present invention provides a quick opening manhole cover assembly for use with virtually any shape manhole cover of a pressure vessel. The assembly broadly includes a manhole cover having outer dimensions which are less than the inner dimensions of the manhole so that the cover can pass freely therethrough, means for raising and lowering the cover into and out of the manhole, follower means, a protection ring mounted about said manhole, sliding lock means to lock the follower to the vessel above the manhole and above the cover, and seal means carried by the manhole cover, where the seal means are engaged against a surface of the protection ring, a surface of the follower means, and a surface of the cover in fluid tight sealing engagement upon engagement of the sliding lock means and axial movement of the manhole cover.

A general object of the invention is to provide a quick opening manway which is suitable for use with virtually any shape manhole and manhole cover such as elliptical, round, square, and hexagonal, to name but a few.

A primary object of the invention is to provide a quick opening manhole cover assembly which does not utilize clamps.

A further object is to provide a manhole cover assembly which cannot be opened when the vessel is pressurized and cannot be closed unless all locking elements are fully engaged to ensure safe operation.

Another object is to provide a manhole cover assembly which requires no tools to open or close.

Still a further object is to provide a manhole cover assembly which uses a special self-seating seal that becomes tighter as pressure within the vessel is increased.

Finally, an important object of the invention is to provide a manhole cover assembly which may be opened and/or closed in about one minute.

These and other objects and advantages will become apparent from the foregoing and ongoing written specification, the drawings, and appended claims.

BRIEF DESCRIPTION OF THE DRAWINGS

FIG. 11 is a diagrammatic illustration similar to FIG. 3 but showing an alternative round embodiment.

DETAILED DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. The drawings are intended to be read together with the specification, and are to be construed as a portion of the entire "written description" of this invention, as required by 35 U.S.C. Section 112. As used in the following description, the terms "up", "down", "clockwise", and "counterclockwise" refer to the orientation of the illustrated structure as the particular drawing figure faces the reader, except as otherwise noted. Similarly, the term "outwardly" refers to the orientation of a surface of revolution relative to its axis.

Figure 1:
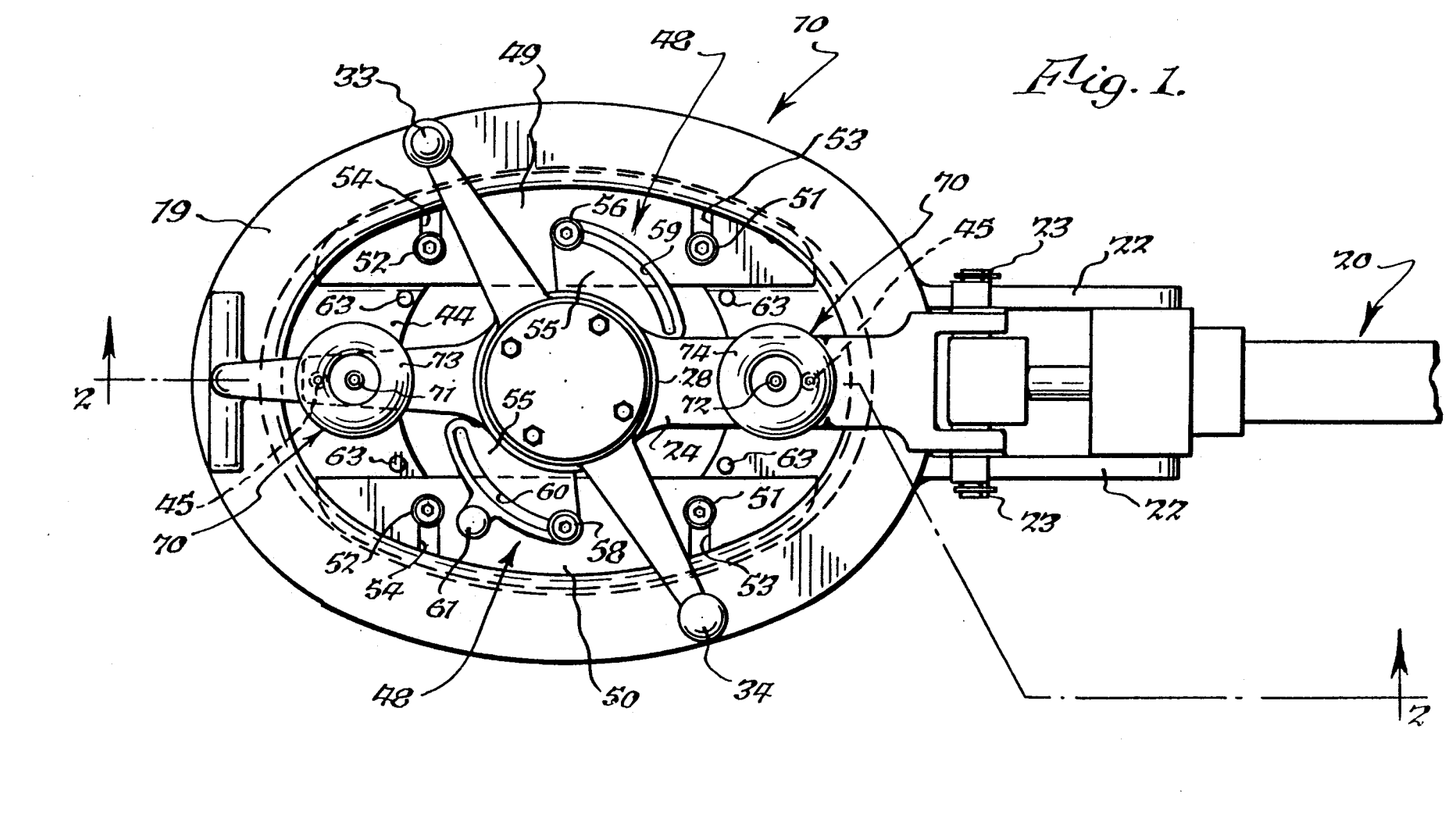
FIG. 1 is a top plan elevation of the manhole cover assembly shown in the locked and sealed position.

Referring now to the drawings, FIG. 1 is a top plan elevation of the manhole cover assembly generally indicated at 10. In the preferred embodiment shown the assembly is elliptical in shape but it is to be understood that the general concept of the assembly renders it suitable for use with virtually any shape manhole cover, merely by changing the shape of various elements recited in the claims accordingly.

Figure 2:
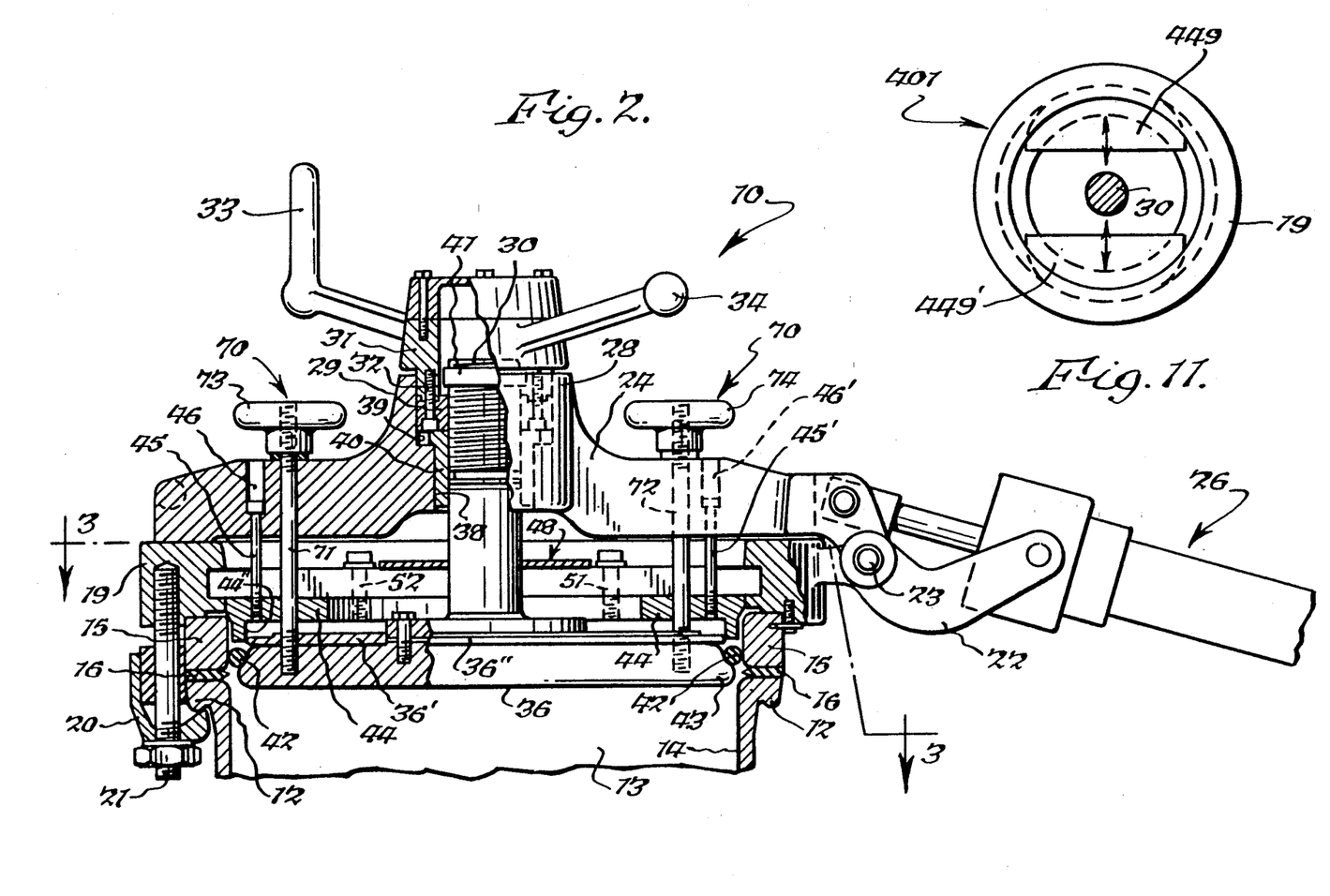
FIG. 2 is a vertical section with parts in side elevation taken generally along line 2—2 of FIG. 1.

Referring to FIG. 2, the assembly is shown in vertical section with parts in side elevation taken generally along line 2—2 in FIG. 1. Again, the quick opening manhole cover assembly is generally indicated at 10, fixed to flange 12 about a vessel manhole 13. It should be appreciated that the interior manhole surface 14, as well as the interior surface of the pressure vessel (not shown) and the surfaces of all elements of the manhole cover assembly 10 exposed to the environment of the pressure vessel are provided with a corrosion and abrasion resistant glass or ceramic coating as is common in the art. It is to be understood, however, that the present invention is equally suitable for use with uncoated corrosion resistant vessels such as those constructed of stainless steel, and is also suitable for use with non-corrosion resistant vessels as well.

One element of the assembly is protection ring 15 which is placed about the manhole flange 12 and is separated from the flange by gasket 16. As best shown in FIGS. 4–7, the interior surface 18 of protection ring 15 is glass-lined. Resting on the top of protection ring 15 is clamp ring 19. Protection ring 15 and clamp ring 19 are fixed to the manhole flange by any suitable means such as clamps 20 and studs 21 located at spaced intervals about the manhole.

Extending from clamp ring 19 is a pair of ears 22. Pivoted to this pair of ears at 23 is one end of bridge structure 24 which spans the manhole opening. About the perimeter of bridge 24 is flange 25 which matingly engages the top surface of clamp ring 19. Also attached to pair of ears 22 and bridge 24 is counter balance mechanism 26, the details of which form no part of the present invention.

Bridge structure 24 includes a housing 28. Within the housing is a drive nut 29 and drive screw 30. The drive nut is secured to tube 31 by bolts 32. Extending outwardly from tube 31 are handcranks 33 and 34. Rotation of handcranks 33 and 34 causes nut 29 to rotate which is threaded to screw 30 and therefore causes axial movement thereof. The screw extends down through the housing where it is attached to manhole cover 36.

As shown in FIG. 2, housing 28 contains a stepped through-bore. Fixedly mounted within lesser diameter through-bore 38 is sleeve bearing 40 while nut 29 is slidingly mounted within greater diameter through-bore 39. Mounted to the top of screw 30 is collar 41. It is important to note that the combination manhole cover-screw-nut-tube is free to move axially upward a small distance when the vessel is under pressure. Downward movement of the cover-screw combination is limited by interference of the lower surface of collar 41 with the upper surface of nut 29.

As best shown in FIG. 2, the outside dimension of the manhole cover is less than the inside dimension of the manhole so that the cover can move easily into and out of the manhole. To this end, turning the handcranks 33 and 34 rotates nut 29 for moving the manhole cover axially into and out of the manhole opening.

Disposed about the outer periphery of manhole cover 36 is a seal 42. Seal 42 may be an O-ring of suitable corrosion resistant material or an appropriately clad gasket or the like as is well known in the art. The outer peripheral surface of manhole cover 36 is contoured so that a portion 43 of the manhole cover underlies seal member 42 to help retain the seal member on the manhole cover.

Manhole cover 36 has mounted on it disk like member 36' having a peripheral edge 36" that slidingly is guided into a cavity in follower 44 by an inner edge 44"'.

As best shown in FIGS. 4–7, located above manhole cover 36 is follower means 44. As shown in FIG. 2, follower means 44 is suspended from bridge 24 by bolts 45 and 45' which are arranged to move up and down in stepped bores 46 and 46', respectively. The threaded portions of bolts 45 and 45' are threaded into follower 44. Bores 46 and 46' are stepped bores with a larger diameter in the top portion of the bridge and a smaller diameter in the lower portion of the bridge. The bolt-stepped bore combination functions as a stop means to limit downward travel of the follower means 44, since the heads of bolts 45 and 45' cannot pass through the smaller diameter bores of stepped bores 46 and 46', respectively. In the elliptical embodiment shown, the follower comprises an elliptically shaped annular ring suspended from the bridge by two bolts. The outer dimensions of the follower 44 are less than the inner dimensions of the clamp ring 19 so that it can freely pass therethrough.

Figures 3, 8, 9, 10:
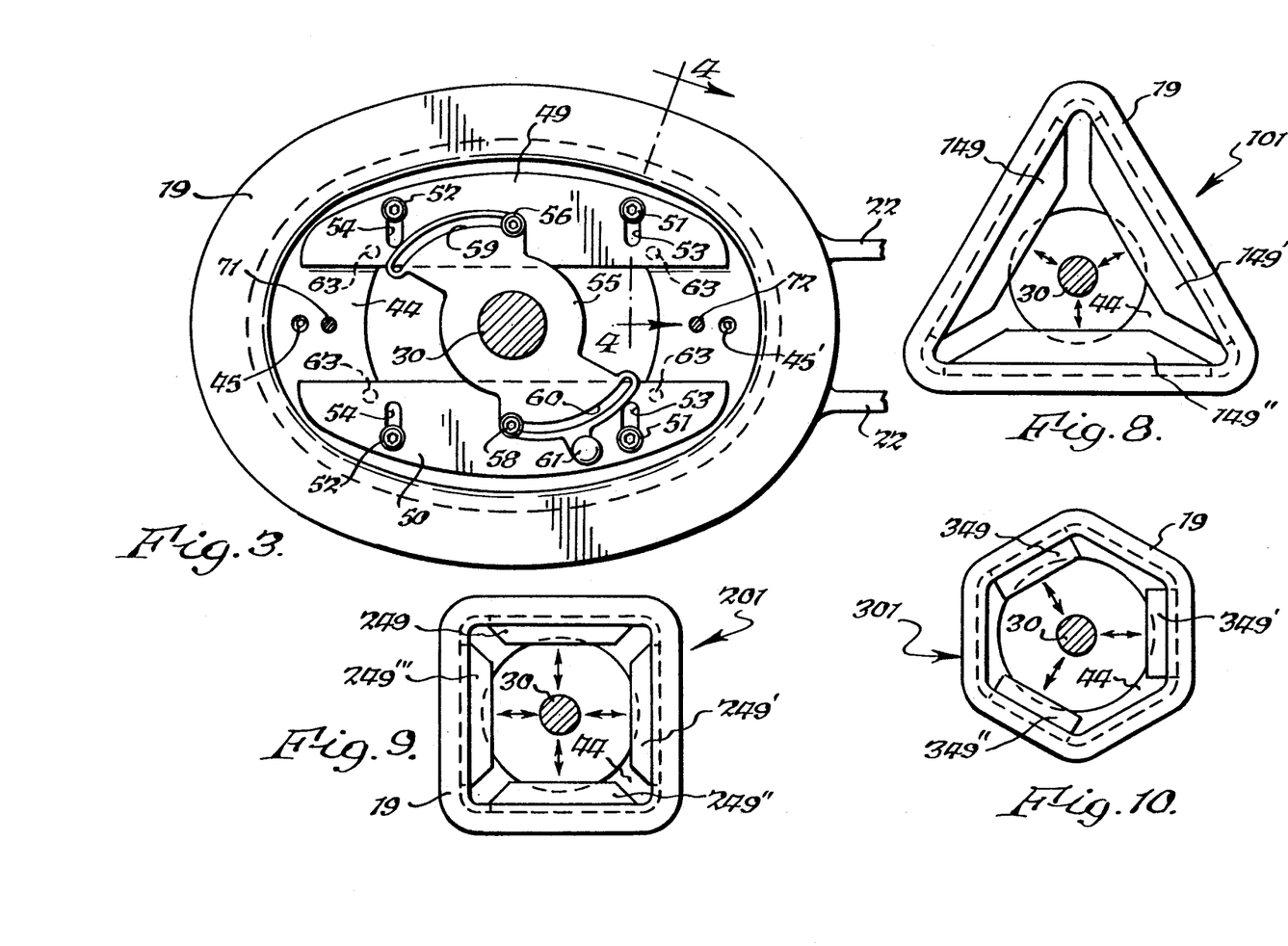
FIG. 3 is a top plan view with parts in section taken along line 3—3 of FIG. 2.
FIG. 8 is a diagrammatic illustration similar to FIG. 3 but showing an alternative triangular embodiment.
FIG. 9 is a diagrammatic illustration similar to FIG. 3 but showing an alternative square embodiment.
FIG. 10 is a diagrammatic illustration similar to FIG. 3 but showing an alternative hexagonal embodiment.

Mounted atop the follower means 44 is lock means 48 shown in top plan view in FIGS. 1 and 3 as comprising sliding lock members 49 and 50. Since both sliding lock members are identical, only member 49 will be described with the understanding that the description also applies to member 50. Lock member 49 is secured to follower 44 by bolts 51 and 52 which pass through slots 53 and 54, respectively, in member 49 and are threaded into the follower 44 below. Cam mechanism 55 is fixedly secured to sliding lock members 49 and 50 by bolts 56 and 58, respectively, which ride in slots 59 and 60, respectively. Cam mechanism 55 is secured to screw 30 and arranged to rotate freely about the screw. FIG. 3 illustrates the locking members in an unlocked position. By moving handle 61 of cam mechanism 55 in a clockwise direction, locking members 49 and 50 move outwardly away from screw 30 and into a locked position as shown in FIG. 1.

Figure 4:
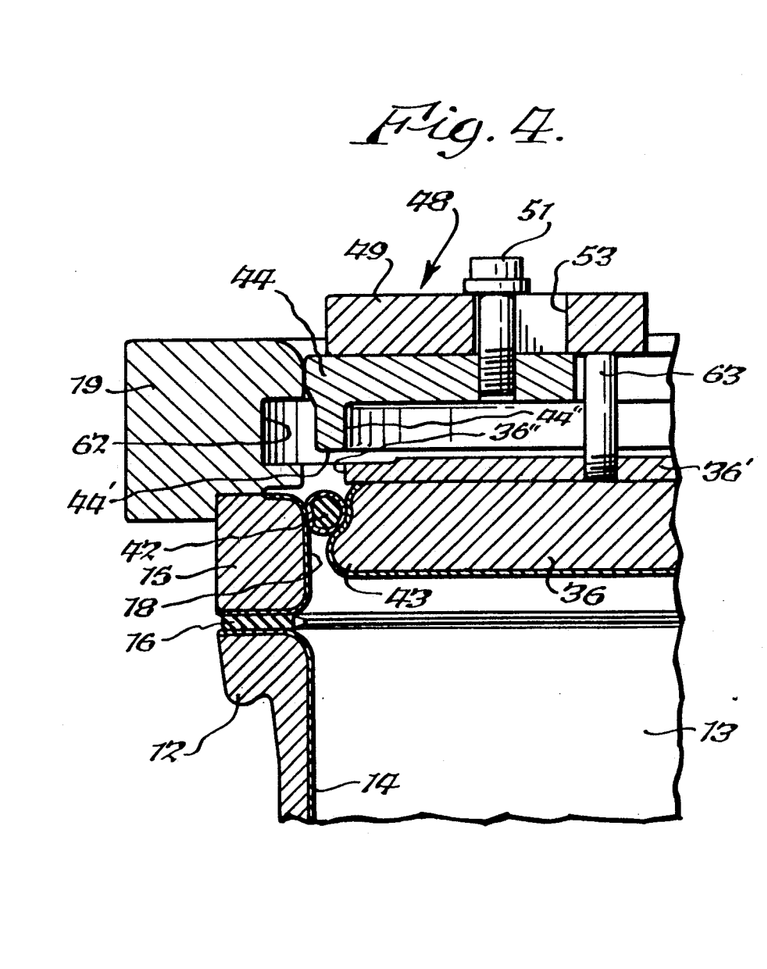
FIG. 4 is a fragmentary vertical section taken along line 4—4 of FIG. 3 showing the manhole cover and locking means in an "up" position prior to insertion into the manhole.

Operation of the invention is best explained by referring first to FIG. 4, which is a fragmentary vertical section taken along line 4—4 of FIG. 3 showing the manhole cover and locking means in an "up" position prior to insertion into the manhole. This is the initial position of the manhole assembly once the bridge structure has been pivoted to position the assembly over the manhole. Shown in FIG. 4 is receptive groove 62 in clamp ring 19, which functions to receive and lockingly engage locking member 49, as will be discussed infra. Also shown in FIG. 4 is secondary locking means 63 which comprises a rod threaded and then welded into the top of manhole cover 36. Locking means 49 is shown as supported by locking means 63 prior to lowering the manhole cover into the hole. In the preferred embodiment, secondary locking means 63 comprises four separate threaded rods, two for each sliding lock member. It is to be understood that FIGS. 4-7 only show one quadrant of the assembly and that the other three quadrants are identical thereto. It should also be appreciated that, although threaded rods are used as the secondary locking means in the preferred embodiment, that other structures would also suffice, so long as the structure functioned to prevent the unlocking of the sliding members as discussed infra.

The first step in securing and sealing the manhole cover is to lower the cover by turning handcranks 33 and 3 (shown in FIG. 2) in a counterclockwise direction (from a perspective looking down upon the assembly). As the manhole cover is initially lowered the locking means and follower means are lowered also, since they are supported by secondary lock means 63. As the cover continues to lower, there comes a point where the follower and lock means cease to move further downward. This is because bolts 45 and 45' have "bottomed out" in bores 46 and 46' and therefore limit the travel of the follower. The point at which travel stops may be adjusted by tightening or loosening bolts 45 and 45' accordingly. The bolts should be adjusted such that travel stops when lock means 49 is aligned with groove 62 of clamp ring 25. It should be noted, however, that even if perfect alignment is not achieved by adjustment of bolts 45 and 45', that lock means 49 can be aligned with groove 62 merely by rotation of handcranks 33 and 34.

Figure 5:
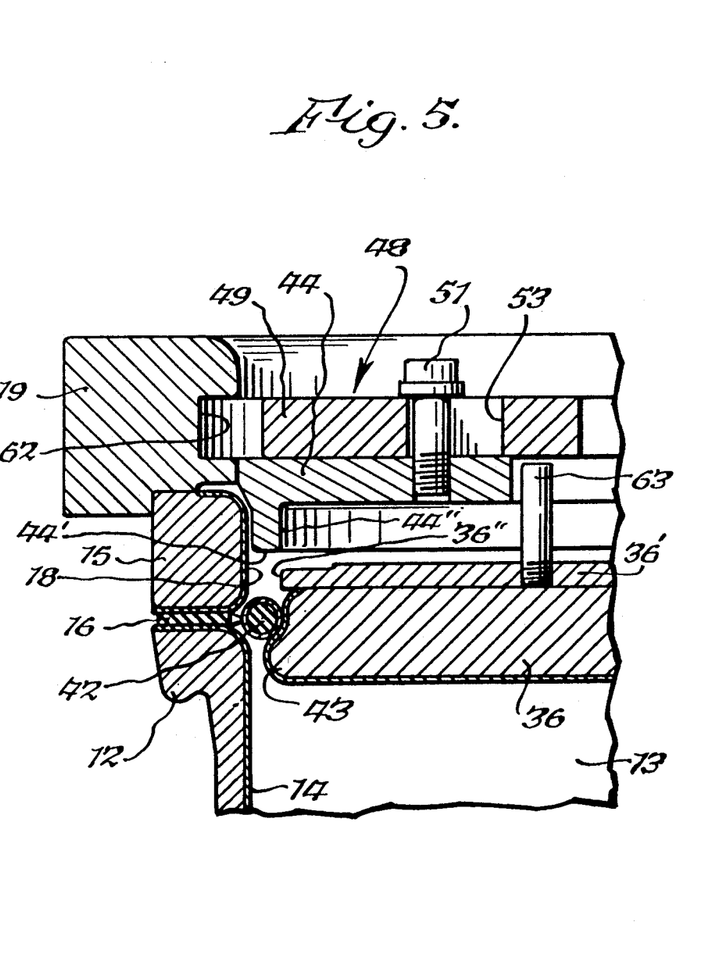
FIG. 5 is a fragmentary vertical section taken along line 4—4 showing the manhole cover and locking means in a "down" position with the locking means unlocked but aligned with the groove in the clamp ring.

FIG. 5 illustrates the manhole cover in a lowered position with the lock means aligned with the groove. It should be noted that, at this point, the cover has been lowered to the point where locking means 63 no longer supports locking member 49. Moreover, locking member 49 and follower 44 have stopped moving downward because bolts 45 and 45' have bottomed out in bores 46 and 46'. Thus it is seen that the lock means is only initially supported by the manhole cover as the cover is lowered.

Figure 6:
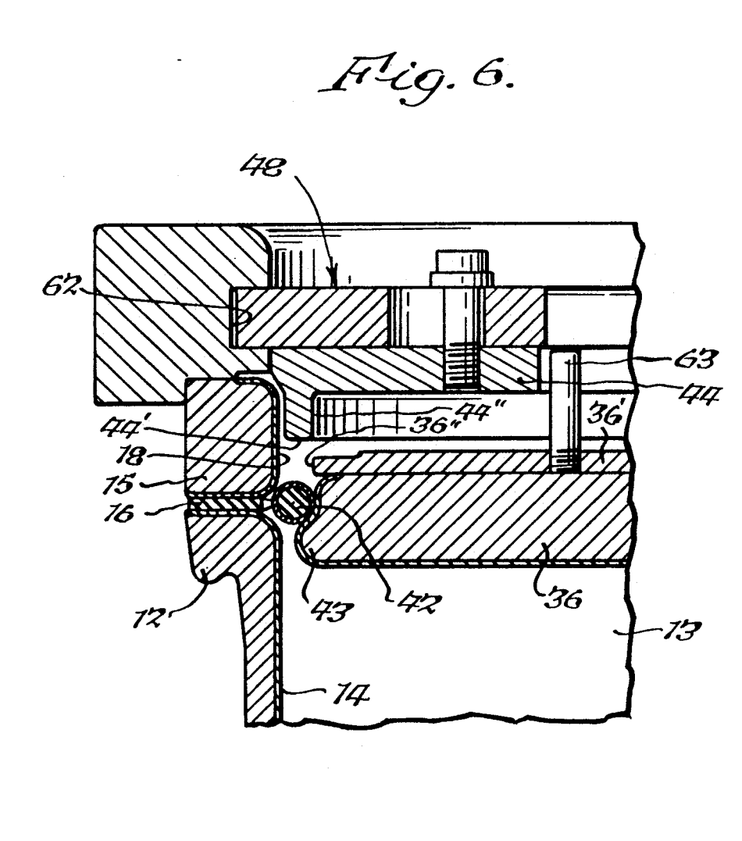
FIG. 6 is a fragmentary vertical section taken along line 4—4 with the locking means in a locked position but with the manhole cover unsealed.

Adverting now to FIG. 6, the assembly is shown with locking member 49 locked into groove 62. As described earlier, this is accomplished by rotating handle 61 in a clockwise direction (see FIGS. 1 and 3). It is important to note in FIG. 6 that, although the sliding lock means is engaged, the manhole cover is still in the "down" position and the assembly is in an "unsealed" posture.

Figure 7:
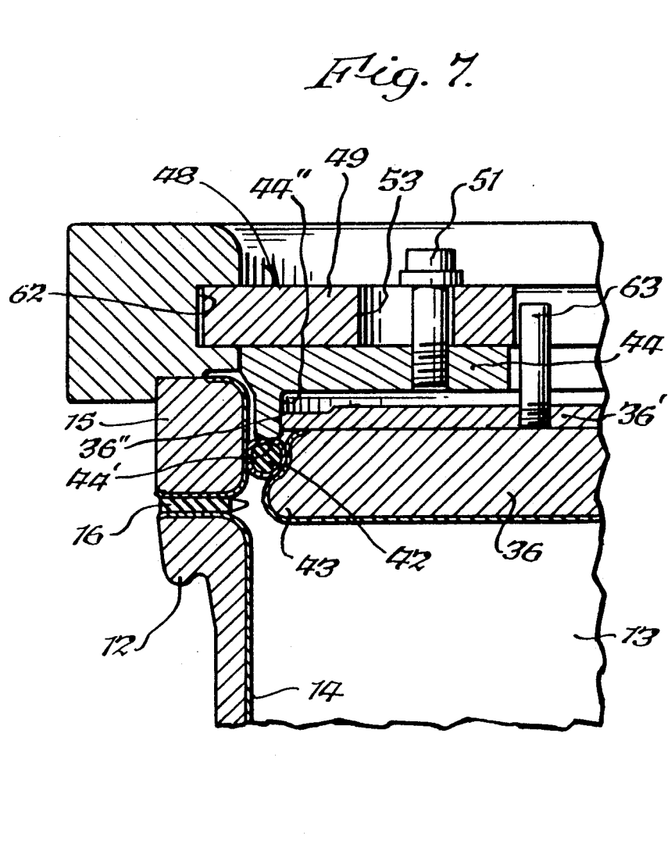
FIG. 7 is a fragmentary vertical section taken along line 4—4 with the locking means in a locked position and with the manhole cover sealed.

Referring now to FIG. 7, once lock 49 is engaged, the cover may be moved upwardly by turning handcranks 33 and 34 (FIG. 2) in a clockwise direction. The cover is moved upwardly until seal 42 comes into sealing engagement with surface 18 of protection ring 15, surface 44' of follower 44 (surfaces 18 and 48 are shown in FIG. 6) and the upwardly contoured surface of cover 36. It is important to note that, as cover 36 is raised, secondary locking means 63 also raises to a position just adjacent to sliding member 49. Thus it is seen in FIG. 7 that, when the assembly is sealed (and the vessel is presumably under pressure) sliding lock member 49 is prevented from moving into an unlocked position by secondary locking means 63. As the sliding lock member moves to the right it comes into contact with locking means 63. This prevents an inadvertent and dangerous opening of the manhole cover when the vessel is under pressure.

Once the cover is in the sealed position, the vessel may be pressurized. As stated earlier, the cover is free to move axially upward and, under pressure, does so which results in even a tighter seal.

To ensure proper seating of the seal, a tertiary locking means 70 is provided, as shown in FIG. 2. In the preferred embodiment shown, this tertiary locking means comprises threaded rods 71 and 72 which are secured to cover 36 and extend upwardly through bores in the bridge. Rods 71 and 72 are connected to handwheels 73 and 74, respectively, which may be rotated to draw the cover into still tighter sealing engagement toward the housing. It is important to note that these handwheels may be operated individually. For example, uneven pressures within the vessel may necessitate tightening of only one side of the cover.

To open the cover, the procedure illustrated in the various drawing figures is essentially reversed. The vessel must first be vented or depressurized in the normal manner, since the present invention does not permit opening of the vessel when it is under pressure. Once depressurized, the tertiary locking means are loosened to allow the cover to move. Next the cover is lowered as shown in FIG. 6, which results in the secondary locking means also being lowered, which in turn allows the sliding lock members to be disengaged. Next, the sliding lock members are disengaged as shown in FIG. 5. Finally, the cover is raised and, eventually, the secondary lock means comes into contact with the sliding lock members as shown in FIG. 4, and proceeds to support and lift the sliding lock member—follower combination. Thus it is seen that the sliding lock member and follower are only supported during initial lowering of the cover and final raising of the cover. Once the cover has been fully raised, the entire assembly may be pivoted to provide access to the manhole.

FIG. 8 illustrates a diagrammatic view similar to FIG. 3 but showing an alternative triangular embodiment 101 of the invention. Shown in the view are trapezoidal locking members 149, 149' and 149" which function in an identical fashion as the semi-elliptical locking members 49 and 50 of the preferred embodiment. With the exception of the shape of the elements, it is contemplated that all elements of the triangular embodiment function in exactly the same manner as in the preferred embodiment.

FIG. 9 illustrates a diagrammatic view similar to FIG. 3 but showing an alternative square embodiment 201 of the invention. Shown in the view are trapezoidal locking members 249, 249', 249" and 249''' which function in an identical fashion as the semi-elliptical locking members 49 and 50 of the preferred embodiment. With the exception of the shape of the elements, it is contemplated that all elements of the square embodiment function in exactly the same manner as in the preferred embodiment.

FIG. 10 illustrates a diagrammatic view similar to FIG. 3 but showing an alternative hexagonal embodiment 301 of the invention. Shown in the view are rectangular locking members 349, 349' and 349" which function in an identical fashion as the semi-elliptical locking members 49 and 50 of the preferred embodiment. With the exception of the shape of the elements, it is contemplated that all elements of the hexagonal embodiment function in exactly the same manner as in the preferred embodiment.

FIG. 11 illustrates a diagrammatic view similar to FIG. 3 but showing an alternative round embodiment 401 of the invention. Shown in the view are semi-circular locking members 449 and 449' which function in an identical fashion as the semi-elliptical locking members 49 and 50 of the preferred embodiment. With the exception of the shape of the elements, it is contemplated that all elements of the round embodiment function in exactly the same manner as in the preferred embodiment.

Thus, it is seen that the invention is not intended to be limited to the preferred embodiment disclosed and claimed, since those having ordinary skill in the art will be able to readily adapt the general concepts of the invention to virtually any shape and size manhole cover without departing from the spirit of the invention. Similarly, the invention is not intended to be limited to any particular number or shape of sliding locking member for a given geometry. For example, although two semi-elliptical locking members are shown for the preferred embodiment, it is conceivable that any number of locking members could be employed, each taking a variety of shapes and sizes.

The foregoing detailed description is an explanation of the preferred embodiment of the present invention, as well as the best mode presently known to the inventor. However, the scope of the present invention is not to be limited by the description of the preferred embodiment but rather is defined by the scope of the claims, following, which are appended hereto and hereby included in and made part of this specification by this reference.

What is claimed is:

1. A quick opening manhole cover assembly comprising:
   (a) a manhole;
   (b) a manhole cover having outer dimensions which are less than the inner dimensions of said manhole in order that said manhole cover may pass freely therethrough;
   (c) a bridge structure pivotally mounted to said pressure vessel and spanning said manhole;
   (d) a housing within said bridge structure, which housing is positionable above said manhole, said housing containing a threaded screw secured at one end to the approximate center of said manhole cover, said housing also containing a handcrank operatively arranged to turn a nut mounted on said screw to raise or lower said manhole cover;
   (e) follower means suspended from said bridge structure and operatively arranged to be carried atop said manhole cover during initial lowering of said cover and during final raising of said cover, wherein said follower means moves upwardly toward said bridge when said cover is raised and moves downwardly away from said bridge when said cover is lowered;
   (f) a protection ring secured to said pressure vessel about said manhole;
   (g) a clamp ring secured to said protection ring, said clamp ring having a groove therein;
   (h) locking means comprising flat plates slidably secured adjacent and atop said follower means and operatively arranged to slide radially into engagement with said groove to lock said follower means and prevent axial movement thereof;
   (i) stop means comprising a stepped bore within said bridge which functions to limit travel of said follower means relative to said housing and also to align said locking means with said groove; and,
   (j) seal means carried by said manhole cover, said seal means being engaged against a surface of said protection ring, a surface of said follower means, and a surface of said cover in fluid tight sealing engagement upon engagement of said sliding lock means and axial movement of said manhole cover.

2. A manhole cover assembly as recited in claim 1 wherein said locking means comprises two or more sliding members linked together by a cam mechanism to facilitate cooperative movement of the sliding members effectuated by movement of the cam mechanism.

3. A manhole cover assembly as recited in claim 1 further including a secondary locking means to prevent disengagement of said locking means when the manhole cover is in a sealed position.

4. A manhole cover assembly as recited in claim 3 wherein said secondary locking means comprises one or more safety pins secured to the top of said manhole cover and operatively arranged to prevent disengagement of said locking means when the manhole cover is in a sealed position.

5. A manhole cover assembly as recited in claim 1 further including a tertiary locking means to stabilize and prevent movement of said manhole cover when said cover is in a sealed position.

6. A manhole cover assembly as recited in claim 4 wherein said tertiary locking means comprises a plurality of threaded rods secured to said cover and extending upwardly through bores in said housing, said threaded rods connected to associated hand-wheels which may be rotated to draw said cover into tighter sealing engagement toward said housing.

7. A manhole cover assembly as recited in claim 1 wherein:
   (a) said seal means is disposed about the periphery of said manhole cover;
   (b) said manhole cover having an outwardly extending peripheral portion underlying said seal means; and
   (c) a lip depending from about the periphery of said follower overlying said seal means, said manhole cover peripheral portion and said lip together forming a seal seat for said seal means.

8. A manhole cover assembly as recited in claim 1 wherein said manhole and said manhole cover are elliptical in shape.

9. A manhole cover assembly as recited in claim 1 wherein said manhole and said manhole cover are rectangular in shape.

10. A manhole cover assembly as recited in claim 1 wherein said manhole and said manhole cover are round in shape.

11. A manhole cover assembly as recited in claim 1 wherein said manhole and said manhole cover are hexagonal in shape.

12. A manhole cover assembly as recited in claim 1 wherein said housing comprises a tube which houses the means for raising and lowering the manhole cover axially into and out of said manhole and a flange which rests upon a top surface of said clamp ring and also includes a pair of ears upstanding from said clamp ring and a bridge pivoted at one end to said pair of ears and spanning at least part of said manhole wherein the entire housing may be pivoted to provide access to said manhole.

13. A manhole cover assembly as recited in claim 1 wherein said means for raising and lowering said manhole cover into and out of said manhole comprises:
 (a) a drive nut journaled to said housing;
 (b) a handwheel for rotating said drive nut;
 (c) a drive screw threaded to said nut, said screw being fixed against rotation so that rotation of said nut drives said screw axially; and,
 (d) means on said manhole cover for attaching the same to an end of said screw.

14. A method of sealing a manhole in a pressure vessel, comprising:
 (a) lowering a manhole cover into a manhole, wherein said cover carries a seal on its outer perimeter;
 (b) positioning a locking means above said manhole and above said cover, wherein said locking means comprises two or more radially sliding members, and positioning is defined to be aligning said sliding members with a receptive groove in a clamping member secured to said vessel about and around said manhole;
 (c) locking said sliding members within said receptive groove; and,
 (d) raising said manhole cover until said seal is engaged against said manhole, said manhole cover and a surface of said locking means in fluid tight sealing engagement.

* * * * *